April 19, 1938.     C. B. HOWARD     2,114,731
VEHICLE DIRECTION INDICATOR
Filed Feb. 23, 1937     2 Sheets-Sheet 1
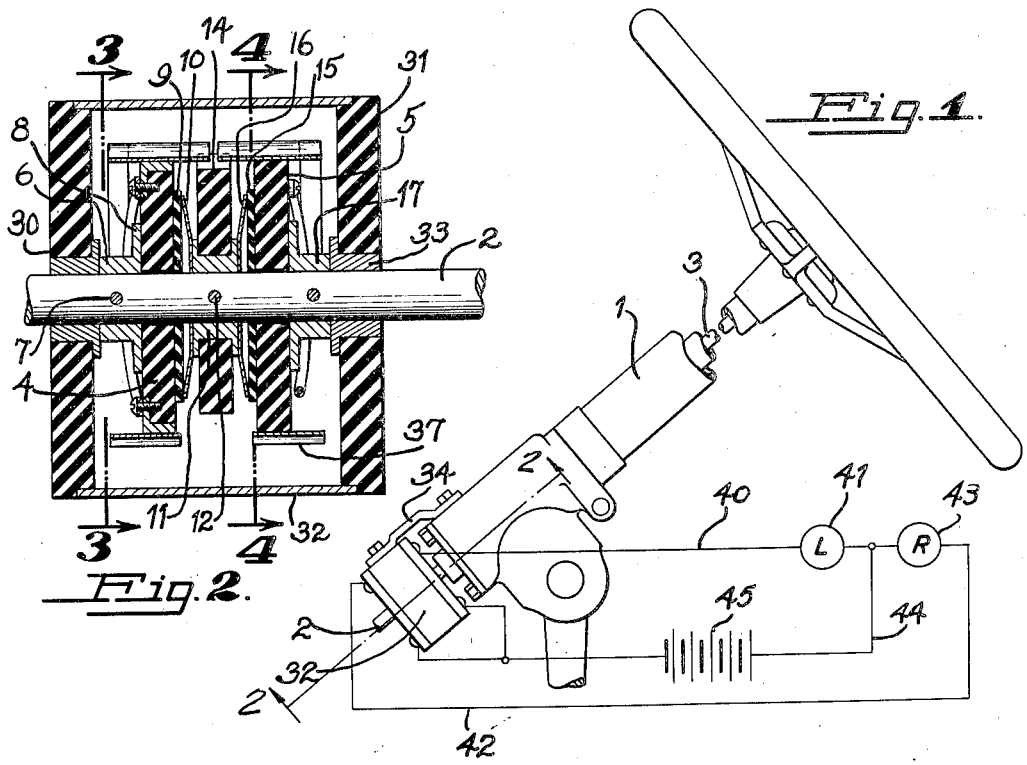
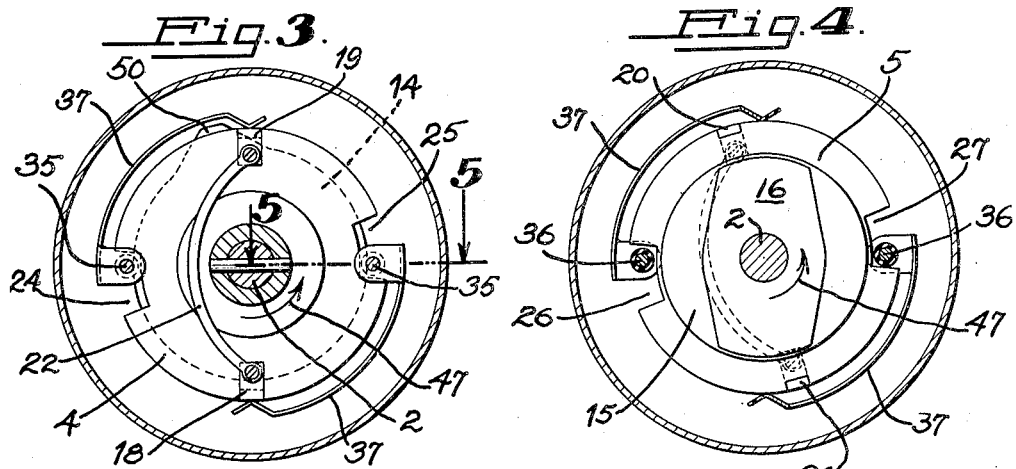
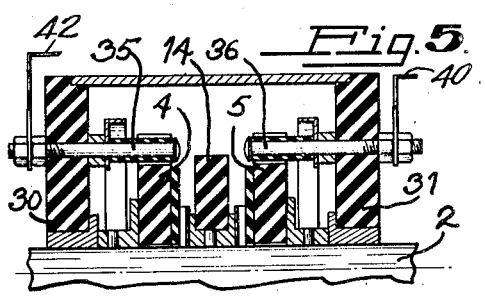
INVENTOR,
CLARENCE B. HOWARD.
BY Lippincott & Metcalf
ATTORNEYS.

April 19, 1938.  C. B. HOWARD  2,114,731
VEHICLE DIRECTION INDICATOR
Filed Feb. 23, 1937  2 Sheets-Sheet 2

Inventor
Clarence B. Howard.

By Lippincott & Metcalf Attorneys

Patented Apr. 19, 1938

2,114,731

UNITED STATES PATENT OFFICE 2,114,731

VEHICLE DIRECTION INDICATOR

Clarence B. Howard, Oakland, Calif., assignor to E. H. Kueffer

Application February 23, 1937, Serial No. 127,112

11 Claims. (Cl. 177—339)

My invention relates to a vehicle direction indicator, and more particularly to a signal adapted to be actuated by the steering mechanism of a vehicle. This application is a continuation in part of my prior application, Serial No. 124,863, filed February 9, 1937, entitled Vehicle signal switch.

Among the objects of my invention are: To provide a signal automatically indicating the direction in which a vehicle is turning; to provide a signal responding to rotation of the vehicle steering gear; to provide a signal indicating the direction of turn of a vehicle irrespective of the position of the vehicle's steering mechanism; and to provide a simple and efficient indicating signal for a vehicle indicating when the steering gear is being turned to right or left, but which gives no indication when the vehicle is proceeding straight ahead.

Other objects of my invention will be apparent or will be specifically pointed out in the description forming a part of this specification, but I do not limit myself to the embodiment of the invention herein described, as various forms may be adopted within the scope of the claims.

In the drawings, Figure 1 is a diagrammatic view showing how the switch of my invention may be attached to a vehicle steering gear together with the circuits operated by the switch.

Figure 2 is a longitudinal sectional view partly in section and partly in elevation showing one preferred form of switch mechanism.

Figure 3 is a sectional view taken as indicated by the line 3—3 in Figure 2.

Figure 4 is a sectional view taken as indicated by the line 4—4 in Figure 2, and Figure 5 is a sectional view showing the location of stop pins, and taken as indicated by the line 5—5 in Figure 3.

Figure 6:
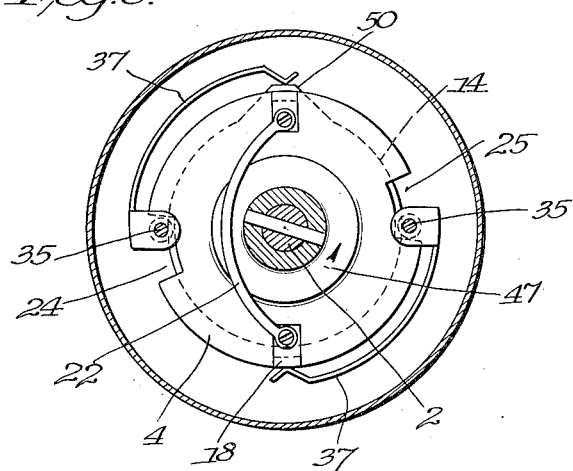
Figures 6 and 7 are sectional views taken as indicated by the line 3—3 in Fig. 2, and show respectively the neutral position of the cam and the changed position of the switch shown in Fig. 3 when the shaft has rotated in the opposite direction.
Figure 7:
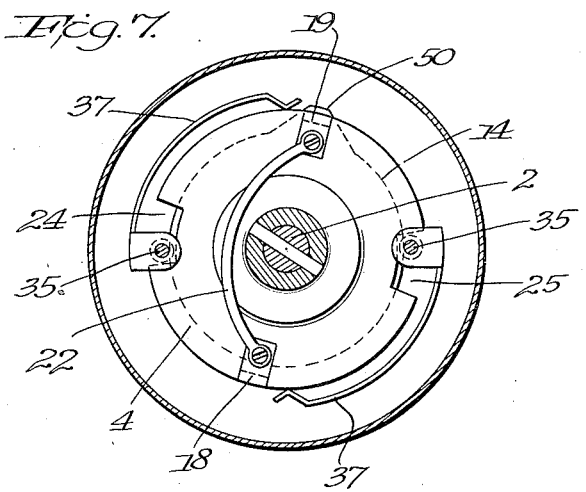

The broad aspects of my invention may be more fully understood by direct reference to the drawings showing a preferred embodiment of my invention.

A steering gear 1, of the conventional type utilized in automobiles, is preferably provided with an extension shaft 2 which is utilized as a driving member for my signal switch.

While I have shown the shaft 2 as being a direct extension of the steering mechanism shaft 3, it is obvious that the switch about to be described may be attached to the steering mechanism in any convenient position by means of a mechanical interlink, in such a manner that the shaft 2 will rotate in synchronism with the rotation of the steering mechanism. I do not, therefore, wish to be limited to the exact example of direct linkage shown herein.

Considering, then, shaft 2 as being rotated by the steering gear irrespective of how it is connected thereto, I prefer to mount thereon a pair of contact discs 4 and 5. These contact discs have a central aperture fitting the shaft 2 relatively loosely, so that they are free to turn. Contact disc 4 is maintained in a pre-determined position by a disc retainer 6 surrounding the shaft and fixed thereto by retainer pin 7, and having a shoulder 8 bearing against disc 4. On the opposite side of the disc is positioned a clutch disc 9 forced against the contact disc by clutch spring 10, the latter being tensioned by a central retaining sleeve 11 fixed to the shaft by retaining pin 12. Rigidly mounted on the clutch retaining sleeve is a cam 14, of insulating material. Contact disc 5 is also provided centrally with a second clutch disc 15 and a second clutch spring 16, the latter also bearing against the central retaining sleeve 11. Contact disc 5 is maintained in position by a second disc retainer 17, also fixed to the shaft. Thus we have an assembly consisting of two contact discs, rotated frictionally by the shaft 2, having between them a cam 14.

Referring to Figures 3 and 4, each contact disc is provided with a pair of opposite segmental and peripheral contacts 18 and 19 on disc 4, and 20 and 21 on disc 5, each pair of segmental contacts being joined by an electrical link 22. Further, each disc is provided with a pair of stop notches 24 and 25 for disc 4, and 26 and 27 for disc 5. A case is then provided for the switch mechanism comprising a back cover 30 and a front cover 31, maintained in spaced relationship by side wall 32, and provided with central bearings 33 to allow the shaft to pass through. The case is prevented from turning by bracket 34 attached to steering frame.

Extending inwardly from the rear wall 30 are a pair of stop pins 35, in such a position that they fall within the notches 24 and 25 and thus serve to limit the arc of rotation of disc 4. In a like manner a similar pair of stop pins 36 enter notches 26 and 27 in the other disc and serve to limit the rotation of disc 5. All four stop pins carry stationary contact brushes 37, each pair of brushes terminating at diametrically opposite points in a position where a circuit may be established through the central electrical link when the disc is in the proper position. Contact is made with the brushes by extending the stop pins through the case, utilizing the stop pins as conductors. The circuit through disc 5 passes through a left indicator wire 40 to a left indicator lamp 41, whereas the corresponding connection through the other disc 4 is through a right indicator wire 42 and through a right indicator lamp 43, the return line 44 passing through a power source 45 before returning to the lower brushes of both discs which may be connected together.

Other circuital connections, in order to accommodate various grounded power sources in automobiles will be apparent to those skilled in the art.

Inasmuch as the main object of the present invention is to provide a signal which will indicate the direction of rotation of the steering gear, and therefore of shaft 2, it is obvious that it is desirable to have one of the discs make the contact in one direction of rotation, and at the same time the other disc should break the contact, and vice versa. In order for this to occur, therefore, it will be necessary for either the brushes, the segmental contacts, or the notches to be offset on one disc with relation to the corresponding parts on the other disc, and in the illustrations shown in Figures 3 and 4 I have shown the notches 26 and 27 as being in a different position with relation to the segmental contacts on disc 5 than on disc 4. Thus when the central shaft 2 is turning in the direction indicated by arrows 47, contact will be made on disc 4 but will be broken on disc 5 as shown in the drawings. Upon reversal of rotation of shaft 2 it will be obvious that friction will carry both discs around until the opposite side of the notches have been engaged by the stop pins, whereupon it will be seen that the contact will be made on disc 5 and broken on disc 4. Thus, irrespective of the position of the steering gear within its complete turning cycle, the switch will indicate by means of the contacts and indicating lamps the reversal of direction of rotation of the steering gear, and therefore of the change of direction of the vehicle itself.

Inasmuch as no provision has been made so far to indicate when the steering mechanism is at a central position, I have provided special means for opening both circuits when the steering mechanism is in straight ahead position. The corresponding brushes 37 on the same side of the discs, as shown in Figure 2, are extended to pass over the path of travel of the high portion 50 of cam 14, and this high portion is made of sufficiently long radius so that when it engages the two brushes they will be lifted from the periphery of both discs and thus both indicator lamps are rendered incapable of lighting.

As soon as the steering mechanism is moved from the central position the brushes will fall back on the periphery, and be in indicating position again. It is obvious that the high portion 50 of the cam 14 may be made of sufficient arc to allow for whatever indication leeway the vehicle may desire. In other words there may be considerable right and left movement of the steering gear allowed before either lamp will operate.

While I have shown the preferred steering gear switch herein as utilizing the type of friction switch described in my prior application, cited above, it is obvious that there are other types of friction operated switches which will perform the sequence of operation herein described. Such switches are deemed to be equivalents within the scope of the appended claims.

One of the principal features of my invention is that it will indicate the direction of turn about to be taken by a vehicle, to another vehicle immediately behind, when a right hand turn is being made. At present a vehicle turning to the right masks the signal of an operator steering the vehicle from the left hand side. This signal is also valuable in that it will tell when the turning arc is finished, as when the vehicle has returned to a normal straight-away direction both lamps extinguish.

I claim:

1. In combination with a vehicle steering mechanism, a shaft connected to be rotated in accordance with movement of said steering mechanism, a pair of movable contacts mounted to be frictionally rotated by a friction element on said shaft, a stop limiting the arc of rotation of each of said movable contacts, a separate stationary contact positioned in the path of each of said movable contacts and cooperating therewith to make and break a circuit, one set of circuit making contacts being offset from the other along the arc of travel so that only one circuit is made at one time, a signal lamp in each of said circuits and a power supply for said circuits, and separate means rotated by said shaft for moving both of said stationary contacts away from contact making position when said steering mechanism is in straight ahead position.

2. In combination with a vehicle steering mechanism, a shaft connected to be rotated in accordance with movement of said steering mechanism, a pair of movable contacts mounted to be frictionally rotated by a friction element on said shaft, a stop limiting the arc of rotation of each of said movable contacts, a separate stationary contact positioned in the path of each of said movable contacts and cooperating therewith to make and break a circuit, one set of circuit making contacts being offset from the other along the arc of travel so that only one circuit is made at one time, a signal lamp in each of said circuits and a power supply for said circuits, and automatic means for breaking both of said circuits when said steering mechanism is in straight ahead position.

3. In combination with a vehicle steering mechanism, a shaft connected to be rotated in accordance with movement of said steering mechanism, a pair of movable contacts mounted to be frictionally rotated by a friction element on said shaft, a stop limiting the arc of rotation of each of said movable contacts, a separate stationary contact positioned in the path of each of said movable contacts and cooperating therewith to make and break a circuit, one set of circuit making contacts being offset from the other along the arc of travel so that only one circuit is made at one time, a signal lamp in each of said circuits, and a cam mounted on and rotating with said shaft and shaped to bear on both of said stationary contacts and lift them from contact making position when said steering mechanism is in straight ahead position.

4. In combination with a vehicle steering mechanism, a shaft connected to be rotated in accordance with movement of said steering mechanism, a pair of discs mounted to be frictionally rotated by a friction element on said shaft, a peripheral contact on each of said discs and moving therewith, a stop limiting the arc of rotation of each of said discs, a separate stationary contact positioned in the path of each of said movable contacts and cooperating therewith to make and break a circuit and a power supply for said circuit, one set of circuit making contacts being offset from the other along the arc of travel so that only one circuit is made at one time, a signal lamp in each of said circuits, and means rotated by said shaft for moving both of said stationary contacts away from contact making position when said steering mechanism is in straight ahead position.

5. In combination with a vehicle steering mechanism, a shaft connected to be rotated in accordance with movement of said steering mechanism, a pair of discs mounted to be frictionally rotated by a friction element on said shaft, a peripheral contact on each of said discs and moving therewith, a stop limiting the arc of rotation of each of said discs, a separate stationary contact positioned in the path of each of said movable contacts and cooperating therewith to make and break a circuit and a power supply for said circuit, one set of circuit making contacts being offset from the other along the arc of travel so that only one circuit is made at one time, a signal lamp in each of said circuits, and automatic means for breaking both of said circuits when said steering mechanism is in straight ahead position.

6. In combination with a vehicle steering mechanism, a shaft connected to be rotated in accordance with movement of said steering mechanism, a pair of discs mounted to be frictionally rotated by a friction element on said shaft, a peripheral contact on each of said discs and moving therewith, a stop limiting the arc of rotation of each of said discs, a separate stationary contact positioned in the path of each of said movable contacts and cooperating therewith to make and break a circuit and a power supply for said circuit, one set of circuit making contacts being offset from the other along the arc of travel so that only one circuit is made at one time, a signal lamp in each of said circuits, and a cam mounted on and rotating with said shaft and shaped to bear on both of said stationary contacts and lift them from contact making position when said steering mechanism is in straight ahead position.

7. In combination with a vehicle steering mechanism, a shaft connected to be rotated in accordance with movement of said steering mechanism, a pair of discs mounted to be frictionally rotated by a friction element on said shaft, a peripheral contact on each of said discs and moving therewith, a stop limiting the arc of rotation of each of said discs, a separate stationary contact positioned in the path of each of said movable contacts and cooperating therewith to make and break a circuit and a power supply for said circuit, one set of circuit making contacts being offset from the other along the arc of travel so that only one circuit is made at one time, a signal lamp in each of said circuits, and a cam mounted on said shaft between said discs and shaped to bear on both of said stationary contacts and lift them from contact making position when said steering mechanism is in straight ahead position.

8. In combination with a vehicle steering mechanism, a shaft connected to be rotated in accordance with movement of said steering mechanism, a pair of circuits each including a signal lamp and a power supply for said circuits, means frictionally actuated by a friction element on said shaft when turned in one direction to close one of said circuits only and when turned in the opposite direction to open the first circuit and close the other, and automatic means for positively opening both circuits when said steering mechanism is in a central position.

9. In combination with a vehicle steering mechanism, a shaft connected to be rotated in accordance with movement of said steering mechanism, a pair of circuits each including a signal lamp and a power supply for said circuits, means frictionally actuated by a friction element on said shaft when turned in one direction to close one circuit and open the other and when turned in the opposite direction to open the first circuit and close the other, and means operated by said shaft for opening both circuits when said steering mechanism is in a central position.

10. In combination with a vehicle steering mechanism, a pair of circuits each including a directional signal device, a power supply, contact supporting devices frictionally actuated by friction elements which are in turn actuated in accordance with movement of said steering gear to connect selectively to said power supply one or the other of said circuits in accordance with the direction of movement of said steering mechanism at any point of rotation thereof, means for maintaining said closure irrespective of continued movement of said steering mechanism in the direction initiating said closure, and means for positively opening both circuits when said steering mechanism is in central position.

11. In combination with a vehicle steering mechanism, a pair of circuits each including a directional signal device, a power supply, contact supporting devices frictionally rotated by friction elements which are in turn actuated in accordance with movement of said steering gear to connect selectively to said power supply one or the other of said circuits in accordance with the direction of movement of said steering mechanism at any point of rotation thereof, means for maintaining said closure irrespective of continued movement of said steering mechanism in the direction initiating said closure, and automatic means for positively opening both circuits whenever said steering mechanism is in a predetermined steering angle including the central position.

CLARENCE B. HOWARD.